(12) United States Patent
Happ et al.

(10) Patent No.: US 9,746,032 B2
(45) Date of Patent: Aug. 29, 2017

(54) SEALING ARRANGEMENT FOR AXIAL ROLLER BEARINGS

(71) Applicant: Schaeffler Technologies AG & Co. KG, Herzogenaurach (DE)

(72) Inventors: Alexander Happ, Hofheim (DE); Wilhelm Walter, Dittelbrunn (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 14/767,416

(22) PCT Filed: Dec. 11, 2013

(86) PCT No.: PCT/DE2013/200357
§ 371 (c)(1),
(2) Date: Aug. 12, 2015

(87) PCT Pub. No.: WO2014/131384
PCT Pub. Date: Sep. 4, 2014

(65) Prior Publication Data
US 2015/0377298 A1     Dec. 31, 2015

(30) Foreign Application Priority Data

Feb. 27, 2013   (DE) .................. 10 2013 203 241

(51) Int. Cl.
*F16C 33/78*    (2006.01)
*F16C 33/76*    (2006.01)
*F16C 43/04*    (2006.01)

(52) U.S. Cl.
CPC ........ *F16C 33/7823* (2013.01); *F16C 33/761* (2013.01); *F16C 33/783* (2013.01); *F16C 43/045* (2013.01)

(58) Field of Classification Search
CPC ...... F16C 33/76; F16C 33/78; F16C 33/7803; F16C 33/7806; F16C 33/7809;
(Continued)

(56) References Cited

U.S. PATENT DOCUMENTS 1,888,215 A  *  11/1932  Bott ................... F16C 33/7886
                                                  277/500
2,044,380 A  *  6/1936  Cobb .................. F16C 33/723
                                                  384/488
(Continued)

FOREIGN PATENT DOCUMENTS

DE       6923852       10/1969
DE       1695087       8/1970
(Continued)

*Primary Examiner* — Alan B Waits
(74) *Attorney, Agent, or Firm* — Volpe and Koenig, P.C.

(57) ABSTRACT

A sealing arrangement (14*a*) on an axial roller bearing (10) which includes two race rings (12, 13) with rolling elements (4) guided therebetween, the sealing arrangement (14*a*) sealing off a rolling element chamber (16) of the axial roller bearing (10). The sealing arrangement (14*a*) has, as reinforcement, a rotationally symmetrical reinforcing sleeve (15*a*) that externally encloses both race rings (12, 13), the sealing arrangement (14*a*) being fixed in position by at least one securing section (20*a*), and some sections of the reinforcing sleeve (15) being covered by or connected to an elastic sealing material (17), in a connected manner, in sealing sections (19*a*, 19*b*) of said sealing arrangement (14*a*).

16 Claims, 2 Drawing Sheets

Figure 1:
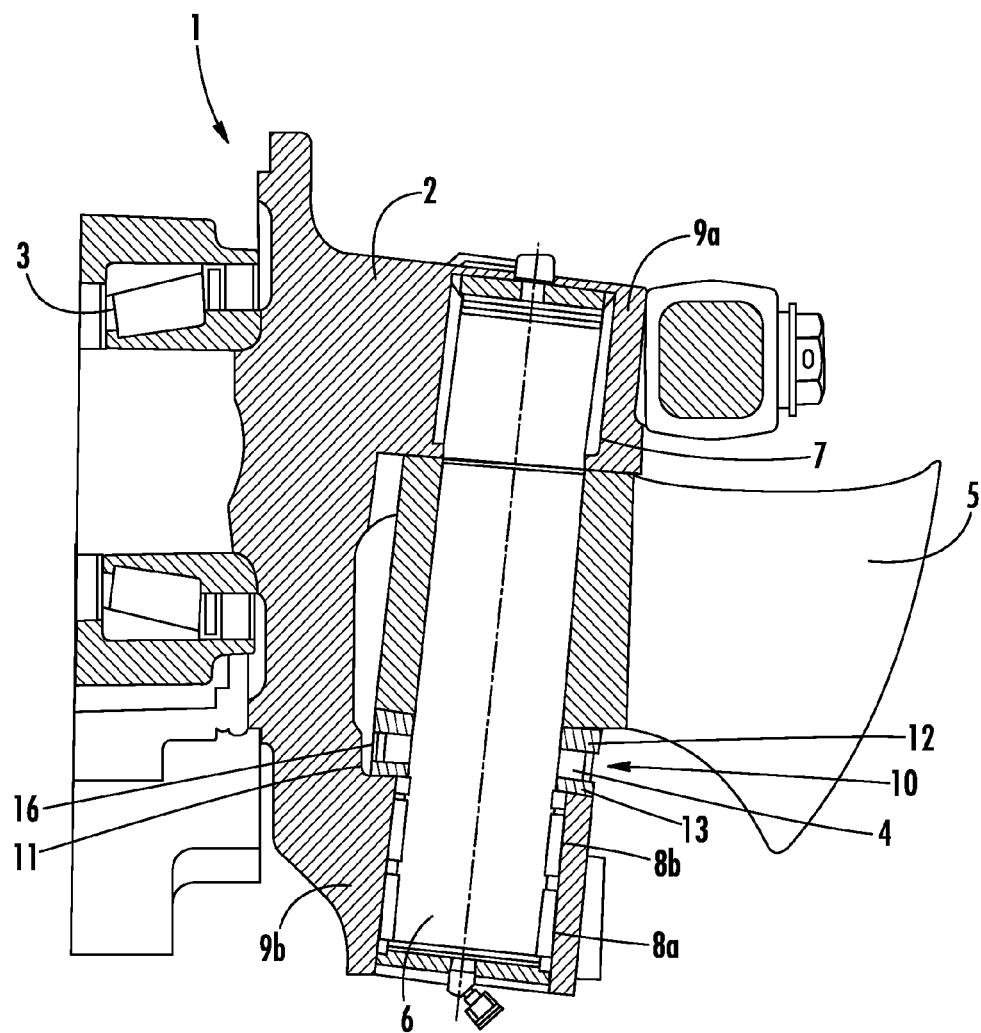

(58) Field of Classification Search
CPC  F16C 33/7813; F16C 33/782; F16C 33/7823;
F16C 33/7826; F16C 33/783; F16C
33/7869; F16C 33/7886; F16C 19/10;
F16C 19/12; F16C 33/761
See application file for complete search history.

(56) References Cited

U.S. PATENT DOCUMENTS

| | | | | |
|---|---|---|---|---|
| 3,010,771 | A * | 11/1961 | Cogger | B60B 27/0005 |
| | | | | 277/369 |
| 3,250,580 | A * | 5/1966 | Sikora | F16C 33/6603 |
| | | | | 384/477 |
| 3,519,316 | A * | 7/1970 | Gothberg | F16C 33/768 |
| | | | | 277/367 |
| 3,590,043 | A | 6/1971 | Graf | |
| 3,594,050 | A * | 7/1971 | Gothberg | F16C 33/7886 |
| | | | | 384/484 |
| 3,770,992 | A * | 11/1973 | Veglia | F16C 33/723 |
| | | | | 384/489 |
| 4,798,394 | A * | 1/1989 | Pollock | B62D 7/18 |
| | | | | 280/93.512 |
| 4,958,947 | A | 9/1990 | Peter et al. | |
| 5,344,241 | A | 9/1994 | Wells | |
| 5,588,915 | A * | 12/1996 | Smith | F16C 21/005 |
| | | | | 464/131 |
| 5,813,675 | A * | 9/1998 | Otto | F16C 33/7879 |
| | | | | 277/407 |
| 6,190,051 | B1 * | 2/2001 | Angelo | F16C 33/7886 |
| | | | | 384/445 |
| 7,140,781 | B2 * | 11/2006 | Niebling | F16C 33/7886 |
| | | | | 384/448 |
| 8,267,591 | B2 * | 9/2012 | Baba | B60B 27/0073 |
| | | | | 384/486 |
| 8,348,512 | B2 * | 1/2013 | Dittmer | F16D 23/14 |
| | | | | 29/898.11 |
| 8,628,249 | B2 * | 1/2014 | Winkelmann | F16C 19/163 |
| | | | | 277/552 |
| 8,702,314 | B2 * | 4/2014 | Takimoto | F16C 33/783 |
| | | | | 277/353 |
| 8,979,385 | B2 * | 3/2015 | Haepp | F16C 33/7886 |
| | | | | 384/480 |
| 2011/0049829 | A1 | 3/2011 | Migliore et al. | |

FOREIGN PATENT DOCUMENTS

| | | | | |
|---|---|---|---|---|
| DE | 2102656 | | 8/1972 | |
| DE | 7406356 | | 6/1974 | |
| DE | 8809903 | | 9/1988 | |
| DE | 9211702 | | 12/1992 | |
| DE | 9310179 | | 9/1993 | |
| DE | 69418281 | | 6/1999 | |
| FR | 2194260 | | 2/1974 | |
| FR | 2921016 | | 3/2009 | |
| GB | 874517 A | * | 8/1961 | ......... F16C 33/7836 |
| GB | 1431075 | | 4/1976 | |
| GB | 1487511 | * | 10/1977 | |
| GB | 2145781 | | 4/1985 | |
| JP | S49119638 | | 10/1974 | |
| JP | S5254745 | | 4/1977 | |
| JP | 2010060138 A | * | 3/2010 | |
| SE | GB 1286872 A | * | 8/1972 | ......... F16C 33/7886 |
| SE | FR 3017170 A1 | * | 8/2015 | ............ F16C 27/066 |

\* cited by examiner

SEALING ARRANGEMENT FOR AXIAL ROLLER BEARINGS

BACKGROUND

The invention relates to an axial roller bearing including two ball races between which roller bodies guided in a roller body cage are arranged, and the axial roller bearing is enclosed on the outside by a sealing arrangement for sealing a roller body space.

Axial roller bearings that are also called longitudinal or compression bearings take on forces in the longitudinal direction of the shaft or axle and are known in many different embodiments. In motor vehicle wheel suspension systems, typically axle journals are used to attach steerable wheels to an axle body of the chassis in a pivoting manner. The connection between the axle journal and the axle body is realized by an axle journal pin that is inserted into corresponding holes of the axle journal and the axle body. Axial forces between the axle journal and the axle body are transmitted via an axial roller bearing mounted on the axle journal pin. An effective seal is required over the service life of the axial roller bearing and for the axial roller bearing to function. This seal prevents, on one side, a discharge of lubricant out of the bearing and, on the other side, the penetration of contaminants into the axial roller bearing. This seal is provided, in particular, for axial journal bearings in which the lubricant remains permanently in the bearing without the need for relubrication. Relubrication could also be provided for axial journal bearings, wherein the bearing is filled with lubricant until there is visible discharge in the area of the seal.

DE 21 02 656 A shows the use of an axial roller bearing in an axle journal bearing of a vehicle axle. An axle body is here supported by means of an axial roller bearing on a lower mount of the fork-shaped end of an axle journal and enables rotation of the axle journal. The upper ball race of the axial roller bearing is arranged in a pot-shaped housing whose sleeve-shaped edge surrounds the lateral surface of the lower washer with clearance. Between an inclined face of the lower ball race and the end face of the lower mount of the fork-shaped end of an axle journal forming the contact face for the lower ball race, a sealing ring with a bead-shaped section is fixed in place. An elastic ring part extends starting from the bead into the space between the sleeve-shaped part and the circumferential surface of the ball race. At the same time, the roller body space or the bearing interior of the axial roller bearing is sealed by the elastic ring part.

SUMMARY

The invention is based on the object of creating a component-optimized sealing arrangement in a simple, compact construction for an axial roller bearing with an improved retaining function and high sealing quality, wherein this arrangement can be produced in a cost-effective manner.

This objective is achieved by one or more features of the invention. The claims also provide advantageous refinements of the invention. The sealing arrangement according to the invention and designed for an axial roller bearing comprises, as reinforcement, a rotationally symmetric reinforcing sleeve that is connected in some areas with a material fit connection to an elastic sealing material. In the installed state, the rotationally symmetric reinforcing sleeve encloses two ball races of the axial roller bearing, wherein the sealing arrangement can be fixed in position on a ball race by at least one fastening section, preferably constructed as an interference fit.

Through the direct material fit connection of the sealing material on the reinforcing sleeve, the components are connected integrally to each other, which produces a desired one-piece construction of the sealing arrangement. By means of the sealing material preferably cured or attached by an adhesive to the reinforcing sleeve, sealing sections can be realized. The sealing material can have a special construction or shape according to the invention or can be supported in a sealing manner on the ball races in connection with the reinforcing sleeve, in order to effectively seal the roller body space of the axial roller bearing.

Through the measures according to the invention, such as the defined retaining function of the reinforcing sleeve, due to the direct connection to the sealing material, an exact installed position of the sealing sections is produced at the same time. This effect is advantageous with respect to the sealing quality relative to previously known two-part sealing arrangements in which the sealing ring was inserted with a certain degree of freedom relative to a sleeve surrounding the axial roller bearing on the outside. The simple component-optimized, compact construction of the sealing arrangement according to the invention also can be produced in a cost-effective way and easily assembled.

According to a preferred construction of the invention, it is provided that a fastening section of the sealing arrangement is formed in which an end zone of the reinforcing sleeve is fixed in place on a diagonal or inclined outer contour of a ball race. Alternatively or additionally, the invention includes a fastening section that is formed in connection with the sealing material of the reinforcing sleeve. For this purpose, a bead formed by the sealing material and extending over the reinforcing sheet is supported in the installed state on the inclined outer contour of a roller bearing ball race.

The construction of the sealing arrangement according to the invention further comprises a reinforcing sleeve that is supported with a non-positive connection on a ball race of the axial roller bearing for forming a first sealing section by means of the elastic sealing material. For this purpose, the reinforcing sleeve encloses the ball race in a pretensioned way with a non-positive connection. A second sealing section interacting with the other ball race forms a sealing lip that is formed from the sealing material and is supported on the ball race in a sealing manner.

Advantageously, the invention offers the ability to directly join the two ball races of the axial roller bearing over the sealing arrangement with the help of the fastening sections. All parts of the roller bearing are thus held captively and form a unit that can be preassembled and simplifies, for example, automated assembly. For achieving an unimpaired relative motion between two ball races, it is provided that a fastening section is fixed in place with clearance relative to the inclined outer contour of a ball race.

Another construction of the sealing arrangement according to the invention includes a stabilization section for the reinforcing sleeve. This comprises a circumferential or partially circumferential step that is oriented axially in the roller body space and can also be constructed as a bead. In one preferred position, the stabilization section is supported in the installed state with a positive fit connection on an inner zone of a ball race. In this way, at the same time a sealing zone can be created in which the stabilization section forms a sealing contact on the ball race by the sealing material.

The reinforcing sleeve of the sealing arrangement is preferably completely covered on one side with the sealing material in the area of the fastening sections, the sealing sections, and the stabilization section. Alternatively, the reinforcing sleeve could have a sealing material completely on one side, wherein this sealing material is fixed to the inside of the reinforcing sleeve with a material fit, in particular, by curing or adhesion.

As the material for the reinforcing sleeve, according to the invention preferably a sheet material is used from which, in a non-cutting process, in particular, by a deep-drawing method, the reinforcing sleeve could also be produced economically in large quantities. For this purpose, in particular, a corrosion-resistant steel sheet with a thickness greater than 0.3 mm, preferably 0.6 mm, and less than 1.0 mm is suitable.

According to another construction of the invention, the invention includes a mounting aid. For this purpose, the reinforcing sleeve can comprise, for example, several symmetrically arranged, radially outward directed journals distributed circumferentially. The journals can be used to simplify the assembly of the sealing arrangement with the help of a tool.

For the sealing arrangement, a rubber-like elastomer is provided as a suitable elastic sealing material according to the invention, for example, NBR or EPM (ethylene-propylene-rubber). This synthetic material is distinguished by a high temperature resistance, wherein the permanent elasticity remains nearly unchanged over the entire temperature range from −40° to +50° in which motor vehicles are operated.

Preferably the axial roller bearings sealed according to the invention are used in steering axles of motor vehicles, in particular, commercial vehicles. Here, in the installed state, an axle body is supported by the axial roller bearing on an axle journal that can be pivoted about an axle journal pin.

BRIEF DESCRIPTION OF THE CLAIMS

Figure 2:
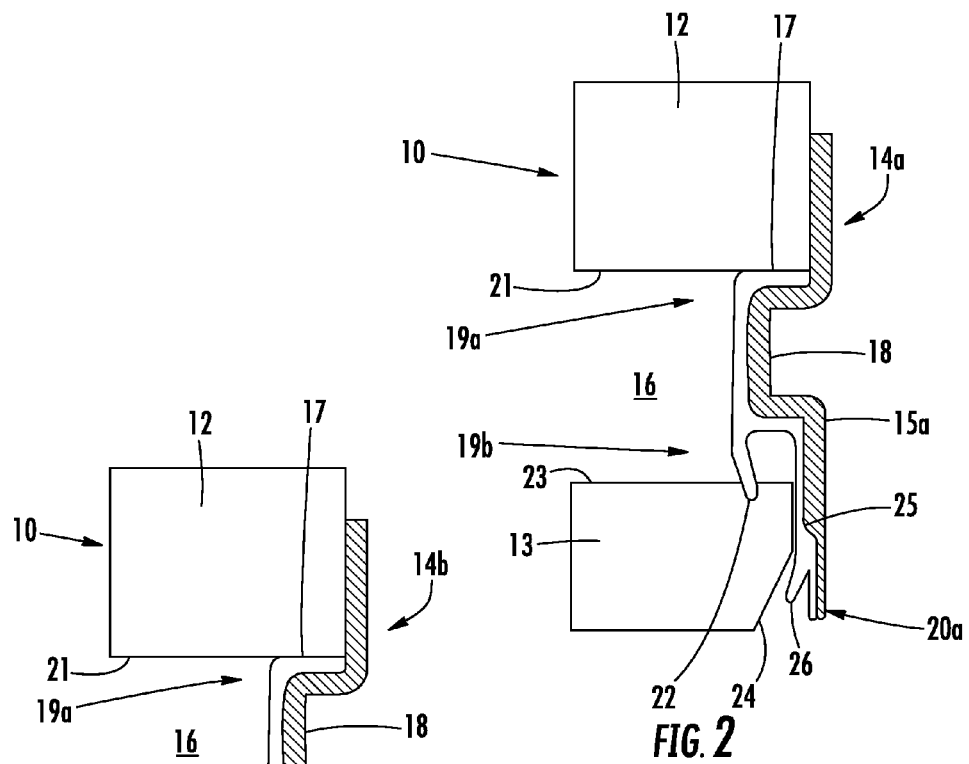
Figure 3:
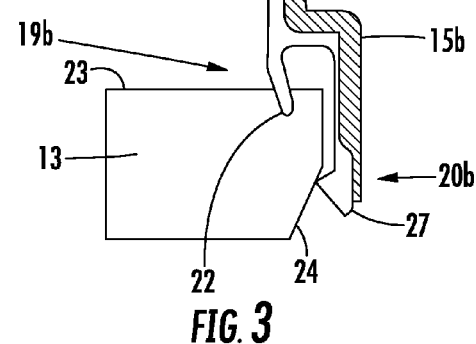
Figure 4:
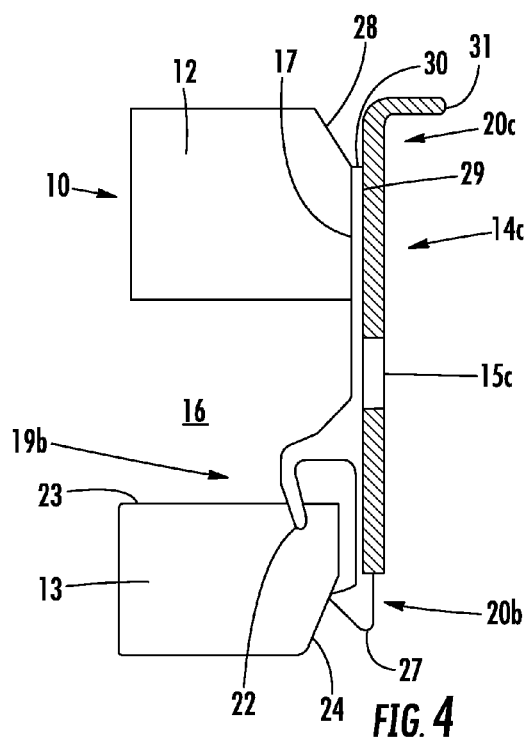

Additional features of the invention are given in the following description and from the drawings in which an embodiment is shown in a simplified form. The invention is not limited to this embodiment. If not mentioned otherwise, components that are identical or that have identical functions are provided with identical reference numbers in the description. Shown are:

FIG. 1 a cross-section of a vehicle steering axle in which an axle body is supported by an axial roller bearing on an axle journal, FIG. 2 schematically, an axial roller bearing with a first embodiment of a sealing arrangement according to the invention, FIG. 3 schematically, an axial roller bearing with a second embodiment of a sealing arrangement according to the invention, and FIG. 4 schematically, an axial roller bearing with a third embodiment of a sealing arrangement according to the invention.

DETAILED DESCRIPTION OF THE PREFERRED EMBODIMENTS

In FIG. 1, a cut-out of a wheel suspension system 1 is shown for a steerable front wheel of a motor vehicle. An axle journal 2 together with associated wheel bearing 3, wheel hub, and not-shown vehicle wheel are supported so that they can pivot relative to an axle body 5. The axle journal 2 and the axle body 5 are connected to each other so that they can pivot by an axle journal pin 6. The axle journal pin 6 fitted in the axle body 5 is supported so that it can rotate by a bearing 7, for example, a plain bearing, in an upper mount 9a and also by two needle bearings 8a, 8b in the lower mount 9b of the axle journal 2. The axle body 5 is supported by an axial roller bearing 10 through which the axle journal pin 6 is guided on a projection of the lower mount 9b of the axle journal 2. An upper ball race 12 of the axial roller bearing 10 is here allocated to the axle body 5 and a lower ball race 13 is allocated to the axle journal 2. Between the ball races 12, 13, roller bodies 4 preferably inserted in a roller body cage are guided. On the outside, the axial roller bearing 10 is enclosed by a sealing arrangement 11 that protects a roller body space 16 from contaminants penetrating from the outside into the roller bearing 10 and also from the loss of lubricant.

In FIG. 2 to FIG. 4, sealing arrangements 14a, 14b, 14c with different constructions are shown in connection with the schematically shown axial roller bearing 10 of which the ball races 12, 13 are shown.

The sealing arrangement 14a according to FIG. 2 is comprised of a reinforcing sleeve 15a forming reinforcement, which surrounds the two ball races 12, 13 of the axial roller bearing 10 on the outside. The reinforcing sleeve 15a is in active connection with the ball races 12, 13 by sealing sections 19a, 19b and also a fastening section 20a. On the inside, the reinforcing sleeve 15a is covered with a sealing material 17 up to an axial contact on the ball race 12. A first sealing section 19a is formed by the stabilization section 18 that is supported indirectly by the sealing material 17 on an axial inner wall 21 of the ball race 12. A sealing lip 22 starting from the stabilization section 18 and supported with a non-positive connection on the inner wall 23 of the ball race 13 forms the second sealing section 19b. Between the ball races 12, 13, the reinforcing sleeve 15a forms a stabilization section 18 that improves the stiffness of the sleeve 15a and is formed as a rectangular step oriented toward the roller body space 16 of the axial roller bearing 10. One end of the reinforcing sleeve 15a allocated to the ball race 13 is provided as a fastening section 20a that contacts, in its end position, an inclined outer contour 24 of the ball race 13 by a shaping or fixing process. As a measure for sealing the produced annular gap 25 relative to the ball race 13, the sealing material 17 forms a sealing lip 26 spread out relative to the ball race 13.

The axial roller bearing 10 can be completed with the sealing arrangement 14a according to FIG. 2 in subsequent mounting steps. The reinforcing sleeve 15a is initially shifted until it contacts the stabilization section 18 on the ball race 12. The inner diameter of the reinforcing sleeve 15a and the outer diameter of the ball race 12 can be selected so that when these parts are joined, a transition or interference fit is produced. Then the roller bodies 4 are allocated with or without the roller body cage to the ball race 12 before the other ball race 13 is set axially into the reinforcing sleeve 15a. Finally the fastening section 20a is fixed in place contacting the inclined outer contour 24 of the ball race 13. Alternatively, a sealing arrangement 14a can be used in which, after successful mounting of the stabilization section 18, for example, by a radially fed shaping tool, it is shaped into the reinforcing sleeve 15a.

FIG. 3 shows the sealing arrangement 14b that differs from the sealing arrangement 14a according to FIG. 2 by a differently shaped fastening section 20b. A bead 27 that is formed by the sealing material 17 and forms the fastening section 20b and is in active connection with the inclined outer contour 24 of the ball race 13 connects to the lower end of the reinforcing sleeve 15*b*.

In FIG. 4, the sealing arrangement 14*c* is shown whose reinforcing sleeve 15*c* does not include a stabilization section. The fastening section 20*b* of the sealing arrangement 14*c* interacting with the ball race 13 matches the design according to FIG. 3. Another fastening section 20*c* of the sealing arrangement 14*c* connected to the ball race 12 is comparable to the fastening section 20*a* shown in FIG. 2. The fastening section 20*c* is formed by the end of the reinforcing sleeve 15*c* that is allocated to the ball race 12 and corresponds to an inclined outer contour 28 of the ball race 12 through shaping in its end position. To seal the annular gap 29 relative to the ball race 12, the sealing material 17 forms a sealing lip 30 spread out relative to the ball race 12. Additionally or alternatively, for creating an effective seal it is possible for the reinforcing sleeve 15*c* to be statically sealed in the contact area of the ball race 12 first by the elastic sealing material 17 and then for the reinforcing sleeve 15*c* to contact directly on the outer contour of the ball race 12. For the sealing arrangement 14*c*, a mounting aid 31 could also be provided. For this purpose, the reinforcing sleeve 15*c* preferably comprises multiple journals that are directed radially outward and by which the sealing arrangement 14*c* can be easily mounted, for example, in connection with a separate tool.

LIST OF REFERENCE NUMBERS

1 Wheel suspension
2 Axle journal
3 Wheel bearing
4 Roller body
5 Axle body
6 Axle journal pin
7 Bearing
8*a* Needle bearing
8*b* Needle bearing
9*a* Receptacle
9*b* Receptacle
10 Axial roller bearing
11 Sealing arrangement
12 Ball race
13 Ball race
14*a* Sealing arrangement
14*b* Sealing arrangement
14*c* Sealing arrangement
15*a* Reinforcing sleeve
15*b* Reinforcing sleeve
15*c* Reinforcing sleeve
16 Roller body space
17 Sealing material
18 Stabilization section
19*a* Sealing section
19*b* Sealing section
20*a* Fastening section
20*b* Fastening section
20*c* Fastening section
21 Inner wall
22 Sealing lip
23 Inner wall
24 Outer contour
25 Ring gap
26 Sealing lip
27 Bead
28 Outer contour
29 Ring gap
30 Sealing lip
31 Mounting aid

The invention claimed is:

1. A sealing arrangement for an axial roller bearing that comprises two ball races between which roller bodies are guided, wherein the sealing arrangement is configured to seal a roller body space of the axial roller bearing and comprises, as reinforcement, a rotationally symmetric reinforcing sleeve that is constructed with an enclosing design for the two ball races on an outside, wherein the sealing arrangement is fixed in place by at least one fastening section and the reinforcing sleeve has sealing sections on a side facing the ball races and the sealing arrangement further includes an elastic sealing material connected to the reinforcing sleeve at least in the sealing sections, the reinforcing sleeve has a surrounding or partially surrounding stabilization section that is oriented projecting axially into the roller body space and forms a first sealing section of the sealing sections via contact of the elastic sealing material to an axial inner wall of a first ball race of the two ball races, and a sealing lip that is made from the elastic sealing material projects from the stabilization section and is supported on an inner wall of the other ball race of the two ball races and forms a second sealing section of the sealing sections,
wherein the fastening section that is formed by the sealing material contacts an outer contour of the other ball race.

2. The sealing arrangement according to claim 1, wherein the fastening section includes a bead that is formed by the sealing material configured to interact with the outer contour of the other ball race.

3. The sealing arrangement according to claim 1, wherein the reinforcing sleeve is supported with a frictional fit on the axial inner wall of the first ball race by the elastic sealing material for forming the first sealing section and the sealing lip is supported with a frictional fit on the inner wall of the other ball race.

4. The sealing arrangement according to claim 1, wherein the ball races of the axial roller bearing are joined by the at least one fastening section of the reinforcing sleeve.

5. The sealing arrangement according to claim 1, wherein the stabilization section is constructed as a step or bead oriented projecting axially in the roller body space.

6. The sealing arrangement according to claim 1, wherein a sheet-metal material is provided as a material for a non-cutting production of the reinforcing sleeve by a deep-drawing method, wherein a sheet metal thickness of the sheet metal material is selected in the range of greater than 0.3 mm and less than 1.0 mm.

7. The sealing arrangement according to claim 1, wherein the reinforcing sleeve comprises a mounting aid.

8. The sealing arrangement according to claim 1, wherein a rubber-like elastomer is provided as the elastic sealing material for the sealing arrangement.

9. An axial roller bearing that comprises two ball races between which roller bodies are guided and with a sealing arrangement according to claim 1.

10. A wheel suspension of a motor vehicle with an axial roller bearing according to claim 9, wherein the wheel suspension comprises an axle body and an axle journal, the axle body and the axle journal are pivotally connected to each other by an axle journal pin, and the axle body is supported by the axial roller bearing on the axle journal.

11. A steering axle of a motor vehicle comprising a wheel suspension according to claim 10.

12. The sealing arrangement according to claim 1, wherein the stabilization section is connected on one side to a first section which extends outside of the roller body space along an outer wall of the first ball race and on an opposite side to a second section which extends outside of the roller body space along an outer wall of the other ball race.

13. The sealing arrangement according to claim 12, wherein the stabilization section includes a first surface which faces the inner wall of the first ball race and which transitions into the first section, and wherein the elastic sealing material is attached to the first surface to form the first sealing section.

14. The sealing arrangement according to claim 13, wherein the stabilization section includes a second surface which faces the inner wall of the other ball race and which transitions into the second section.

15. The sealing arrangement according to claim 14, wherein the at least one fastening section is attached to the second section.

16. The sealing arrangement according to claim 1, wherein the elastic sealing material is attached to the stabilization section on a side of the reinforcing sleeve which faces the ball races.

* * * * *